United States Patent
Fushihara et al.

(10) Patent No.: US 6,743,490 B2
(45) Date of Patent: Jun. 1, 2004

(54) PACKAGING BOX FOR GOLF BALL

(75) Inventors: Kazuhisa Fushihara, Hyogo (JP); Kuniyasu Horiuchi, Hyogo (JP); Norio Yoshiga, Tokyo (JP); Jun Takagi, Tokyo (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/750,700

(22) Filed: Jan. 2, 2001

(65) Prior Publication Data
US 2001/0032794 A1 Oct. 25, 2001

(30) Foreign Application Priority Data
Jan. 13, 2000 (JP) ........................................ 2000-004118

(51) Int. Cl.⁷ ................................................. B65D 1/28
(52) U.S. Cl. .................... 428/34.2; 428/34.1; 428/35.6; 428/35.7; 428/172; 428/481; 428/910; 229/162.7; 206/315.9
(58) Field of Search ............................... 428/34.2, 172, 428/481, 910, 34.1, 35.6, 35.7; 206/315.9; 229/162.1, 162.7, 117.27

(56) References Cited

U.S. PATENT DOCUMENTS

| | | | | |
|---|---|---|---|---|
| 4,826,004 A | * | 5/1989 | Dupuy ..................... | 206/45.34 |
| 5,458,933 A | * | 10/1995 | Suskind ..................... | 428/34.2 |
| 5,489,474 A | * | 2/1996 | Shinoda et al. .............. | 428/343 |
| 5,665,442 A | * | 9/1997 | Andersen et al. ........... | 428/36.4 |

FOREIGN PATENT DOCUMENTS

| | | |
|---|---|---|
| JP | 61-27816 | 2/1986 |
| JP | 06-064111 | 3/1994 |
| JP | 07-205278 | 8/1995 |
| JP | 3025803 | 4/1996 |
| JP | 8252895 | 10/1996 |

OTHER PUBLICATIONS http://www.mpi.mpi–mrc.co.jp/english/newbusi/main.htm, Mitsubishi Plastics, Inc., viewed and printed Nov. 19, 2002.*

English translation of Japanese Utility Model Application Laid–Open No. 47–37324, published Dec. 25, 1972, pp. 1–3. drawings not provided.

* cited by examiner

Primary Examiner—Harold Pyon
Assistant Examiner—Walter B Aughenbaugh
(74) Attorney, Agent, or Firm—Birch, Stewart, Kolasch & Birch, LLP

(57) ABSTRACT

A packaging box, for a golf ball, is formed by folding a packaging sheet comprising a decomposable laminate material consisting of a polylactic acid-containing polymer film and a sheet of paper laminated with the polylactic acid-containing polymer film. A portion corresponding to a window is cut out from the paper, and the window is covered with the polylactic acid-containing polymer film laminated on the paper. The window is formed straddlingly on two or three planes such that the polylactic acid-containing polymer film covering the window is bent perpendicularly at a boundary between the planes adjacent to each other. A raised portion is formed on the packaging sheet.

2 Claims, 8 Drawing Sheets

Prior Art

Prior Art

PACKAGING BOX FOR GOLF BALL

FIELD OF THE INVENTION

The present invention relates to a packaging box for a golf ball, and more particularly to a packaging box which can be decomposed completely when it is disposed into the ground in consideration of environmental protection, looks fine, and is not damaged easily to allow the packaging box to have a high function.

DESCRIPTION OF THE RELATED ART

The mode of packaging golf balls to be used in a golf course is different from that of packaging golf balls to be used in a training place. The former golf ball is mostly sold by the dozen or half a dozen at a shop by putting three or four golf balls in an inner box 1 called sleeve and these inner boxes 1 packaged in an outer box 2, as shown in FIG. 4A. More specifically, when the inner box 1 accommodates four golf balls B, three inner boxes 1 are packaged in the outer box 2 to prepare one-dozen box, whereas when the inner box 1 accommodates two golf balls B, three inner boxes 1 are packaged in the outer box 2 to prepare half-a-dozen box. The reason the golf balls are packaged in the inner box is to distinguish the number of golf ball in a golf course, therefore golf balls having the same number are packaged in the same inner box.

The golf ball for the training place is not sold at a shop but delivered to the training place by packaging them in a corrugated cardboard box.

Mostly, inner boxes 1 and outer boxes 2 are composed of paper and a resinous film laminated on the paper to allow them to look fine and reinforce the paper. Polypropylene, polyethylene, and polyvinyl chloride are hitherto used as the resinous film to be laminated on the paper.

As shown in FIG. 4B, some packaging boxes for a golf ball have a window. More specifically, some inner boxes 1 have a window 1a consisting of a transparent resinous film 3 formed on a portion thereof to allow golf balls B accommodated in the inner box 1 to be seen well. The same film as the resinous film laminated on the paper is used for the transparent resinous film 3 and the outer of transparent resinous film 3 is bonded at surrounding of the window.

Normally, the used packaging box for golf ball is burnt as flammable waste. In some cases, it is buried under the ground as waste. In the latter case, the paper is decomposed when it is left in a natural environment, whereas plastics laminated on the paper as the paper-reinforcing material are not decomposed. To bury the undecomposable plastics under the ground pollutes environment, which has become a social problem recently.

Further, the window 1a of the box is covered with the resinous film 3 as same as the resinous film laminated on the paper covers and the resinous film 3 has a low strength. Therefore, when the window 1a is formed straddlingly on two or more planes of the inner box 1, folded lines of the resinous film cannot be formed sharply, which is not preferable in consideration of the appearance of the inner box. Another problem of the conventional packaging box is that during transport of golf balls, golf balls move in some extent in the inner box, thus colliding with the resinous film 3 forming the window 1a. In this case, there is a possibility that the golf balls may damage the resinous film 3. If the window 1a is large, the resinous film 3 forming the window 1a is liable to be damaged. Therefore, the size of the window is limited.

SUMMARY OF THE INVENTION

The present invention has been made in view of the above-described problems. Thus, it is an object of the present invention to provide a packaging box, for a golf ball, having an environment-unpolluting decomposable laminate material which forms a harmless substance when it is buried under the ground, can be bent sharply when it is bonded to a window-forming portion of the packaging box, and is not easily damaged when the golf ball collides therewith.

To achieve the object, there is provided a packaging box, for a golf ball, formed by folding a packaging sheet comprising a decomposable laminate material consisting of a polylactic acid-containing polymer film and a paper laminated with the polylactic acid-containing polymer film.

The polylactic acid-containing polymer film is a copolymer of lactic acid obtained by fermenting bacteria of grain starch. The polylactic acid-containing polymer film is biodegradable. Thus when the polylactic acid-containing polymer film is disposed into the ground, natural hydrolysis proceeds in the ground without leaving its original shape. Bacteria forms a product formed by the hydrolysis into a harmless decomposed substance consisting of water and carbon dioxide. Accordingly, the packaging box formed of the packaging sheet having the biodegradable paper combined with the laminate material consisting of the polylactic acid-containing polymer film is decomposable when it is left in the ground and does not pollute environment. When the packaging box is burnt, it does not damage an oven because it is low in its quantity of heat and does not pollute the atmosphere.

The polylactic acid-containing polymer film composing the laminate material is higher than polypropylene and polyethylene hitherto used in strength, rigidity, transparency, and glossiness. Thus, the packaging box, for a golf ball, formed of the packaging sheet having the biodegradable paper laminated with the laminate material consisting of the polylactic acid-containing polymer film is higher than the conventional one in strength. That is, the packaging box does not get out of shape easily and appears fine because of its superior transparency and glossiness.

A portion corresponding to the window is cut out from the paper, and the window is covered with the polylactic acid-containing polymer film laminated on the paper.

In this case, it is unnecessary to bond a separate window-covering film to the paper. The installation of the window-covering film on the paper can be achieved by the operation of laminating the polylactic acid-containing polymer film entirely on the paper. Because the polylactic acid-containing polymer film has a high strength as described above, the golf ball accommodated in the packaging box does not damage the polylactic acid-containing polymer film, when the golf ball collides with the polylactic acid-containing polymer film owing to vibrations of the packaging box during transport thereof. Consequently, the size of the window is not limited, which allows a design to be made as desired. Because the polylactic acid-containing polymer film has a high degree of transparency, it allows the golf ball accommodated in the packaging box to be seen therethrough well from the outside when it is used as the window-covering film. Thus, the polylactic acid-containing polymer film does not hinder the purpose of forming the window on the packaging box.

When the packaging sheet is folded to form a box, the window is formed straddlingly on two or three planes such that the polylactic acid-containing polymer film covering the window is bent perpendicularly at a boundary between the planes adjacent to each other.

When window-covering portion of the polylactic acid-containing polymer is cornered by bending it, it can form a sharp edge at the portion thereof bent perpendicularly because it has a high degree of strength and rigidity. Therefore, the polylactic acid-containing polymer film can enhance the quality of the packaging box.

The polylactic acid-containing polymer film allows the window to be large. That is, the polylactic acid-containing polymer film allows the window to be formed straddlingly on the three planes of the packaging box. In this case, it is easy to bend the window-covering portion of the polylactic acid-containing polymer film perpendicularly at two portions.

Raising processing of forming a fine convex portion on the surface of the packaging sheet can be preferably accomplished. When the packaging sheet is formed as a box, the raising processing is carried out to form the processed portion as the convex portion on the surface of the packaging box. In the raising processing, with the paper laminated with the polylactic acid-containing polymer film, the packaging sheet is pressed with a concave plate and a convex plate disposed above and below the packaging sheet to form the convex portion on the surface thereof.

The polylactic acid-containing polymer film which is used in the present invention is higher in its strength and rigidity than polypropylene, polyethylene, and the like hitherto used as the laminate material. Thus, the paper laminated with the polylactic acid-containing polymer film can follow the shape of convex/concave portions of the concave plate and the convex plate. Therefore, when a fine convex portion is formed by the raising processing, the edge of the convex portion can be formed distinctly, unlike the conventional laminated paper, thus allowing the packaging box to look fine. Another advantage of the polylactic acid-containing polymer film is that it is not marred or damaged when the convex portion is formed.

It is preferable to use the polylactic acid-containing polymer film heat-treated after it is formed by being biaxially drawn to improve its heat-resistant property, strength and rigidity while maintaining its transparency.

A design is printed on the paper. The polylactic acid-containing polymer film is laminated on the printed surface of the paper. The packaging box of the present invention can be preferably used as an inner box for accommodating two to four golf balls therein. A plurality of inner boxes are packaged in an outer box to prepare the outer box containing one dozen of golf balls or half a dozen thereof. Needless to say, it is preferable to form the outer box of a packaging sheet consisting of paper and the polylactic acid-containing polymer film laminated thereon. The polylactic acid-containing polymer film is high in its strength and rigidity. Thus, it is possible to form a window on the outer box as well and cover the window with the polylactic acid-containing polymer film. It is also possible to form the raised portion on the packaging sheet.

DETAILED DESCRIPTION OF THE PREFERRED EMBODIMENTS

The embodiments of the present invention will be described below with reference to drawings.

Figure 1A:
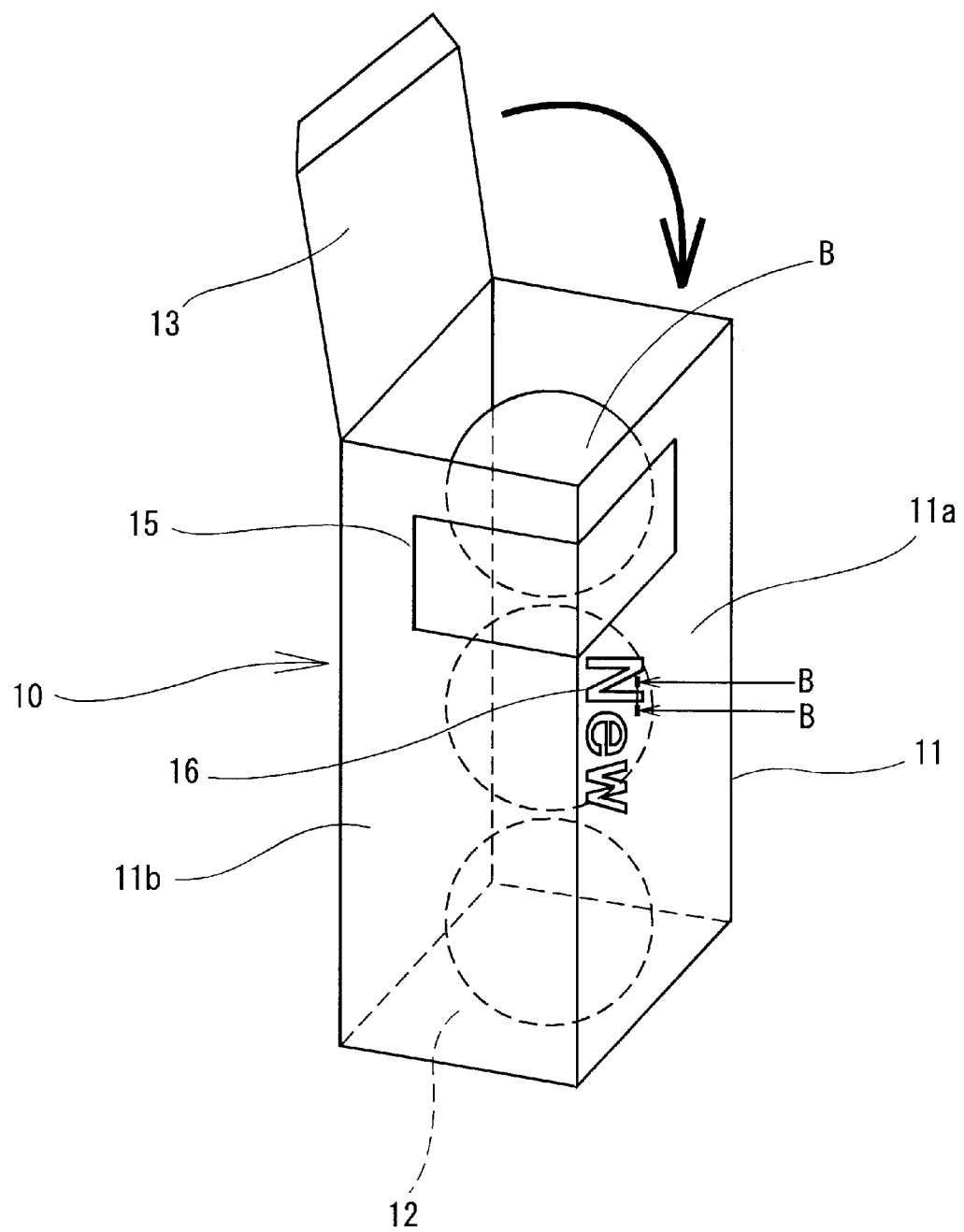
FIG. 1A is a perspective view showing a packaging box for golf ball according to the present invention.
Figure 1B:
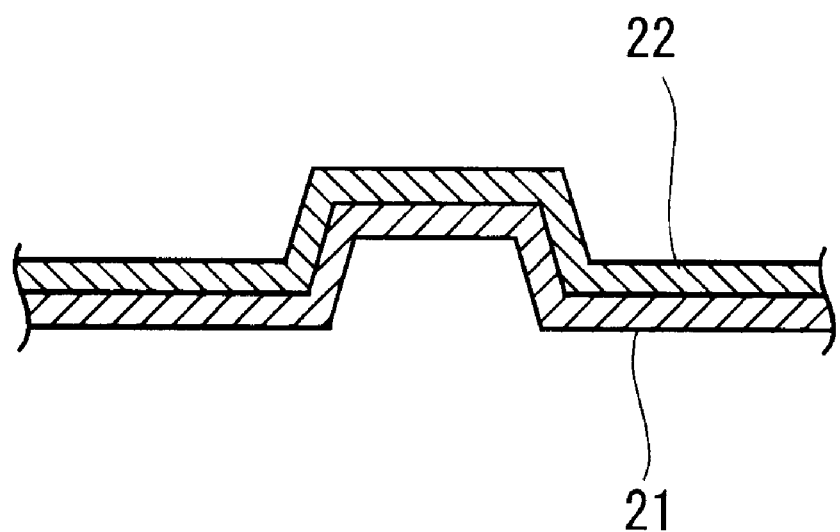
FIG. 1B is a sectional view taken along a line B—B of FIG. 1A.
Figure 2A:
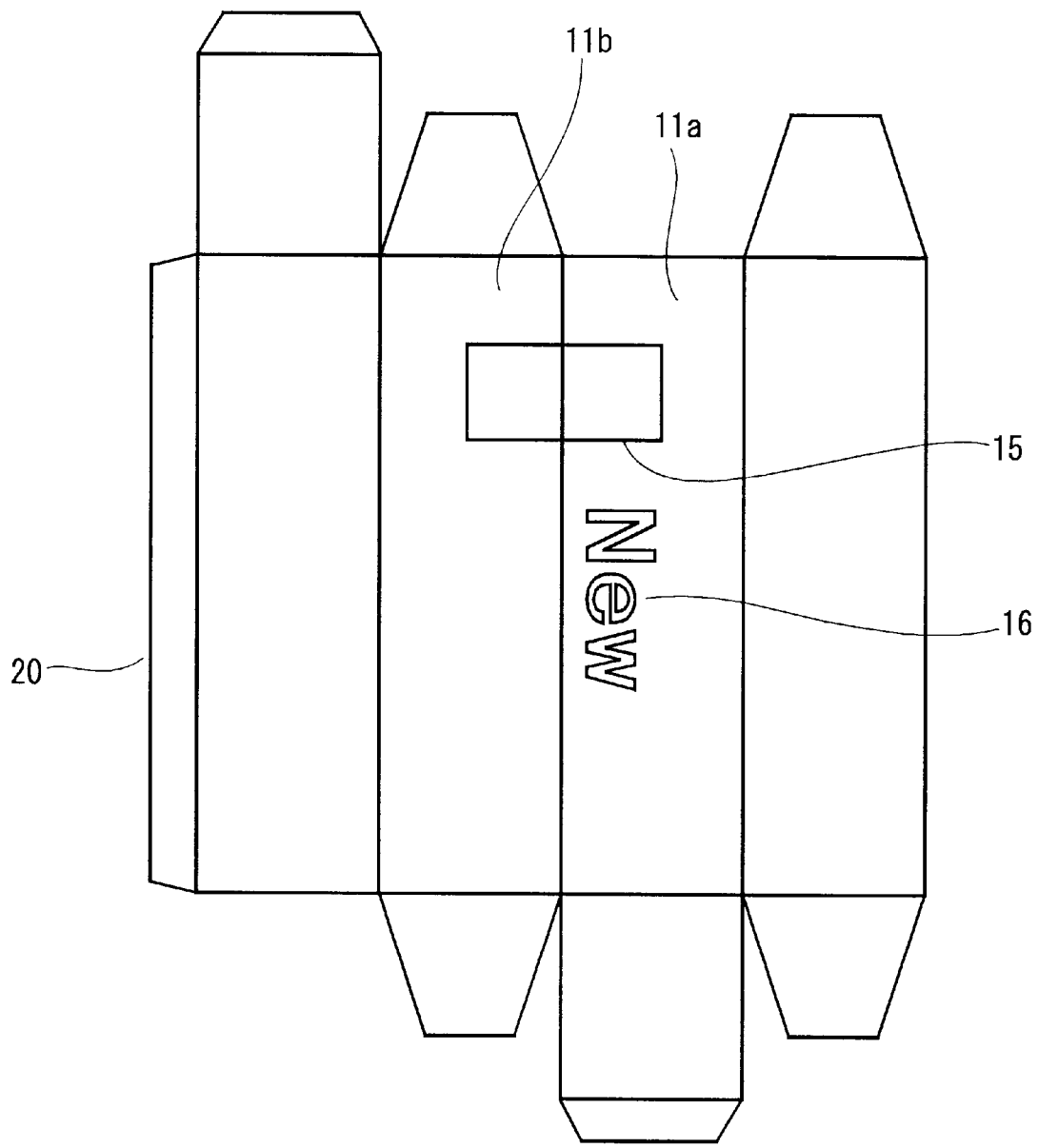
FIGS. 2A through 2C show a packaging sheet forming the packaging sheet.
Figure 2B:
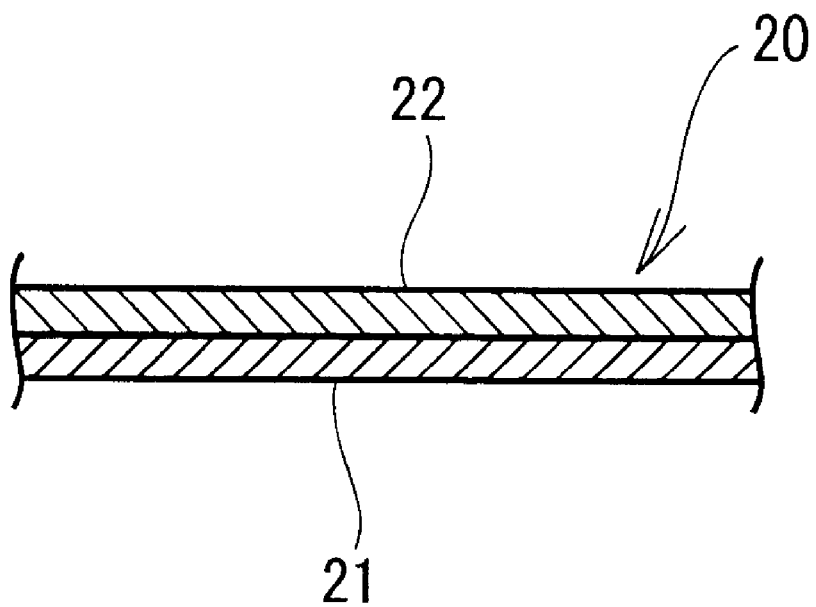
Figure 2C:
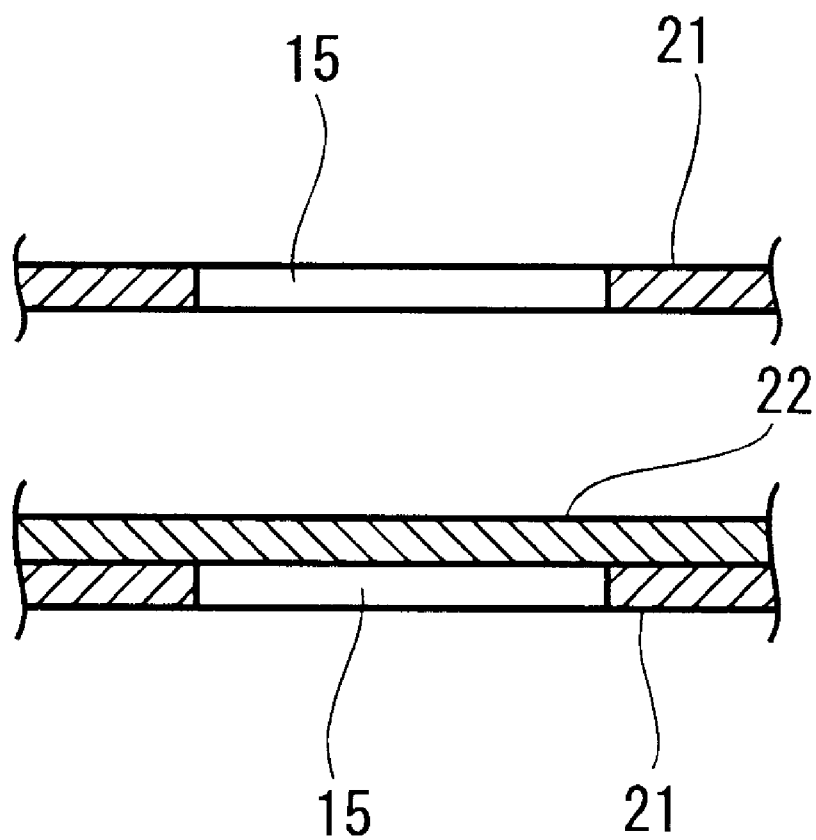
Figure 3:
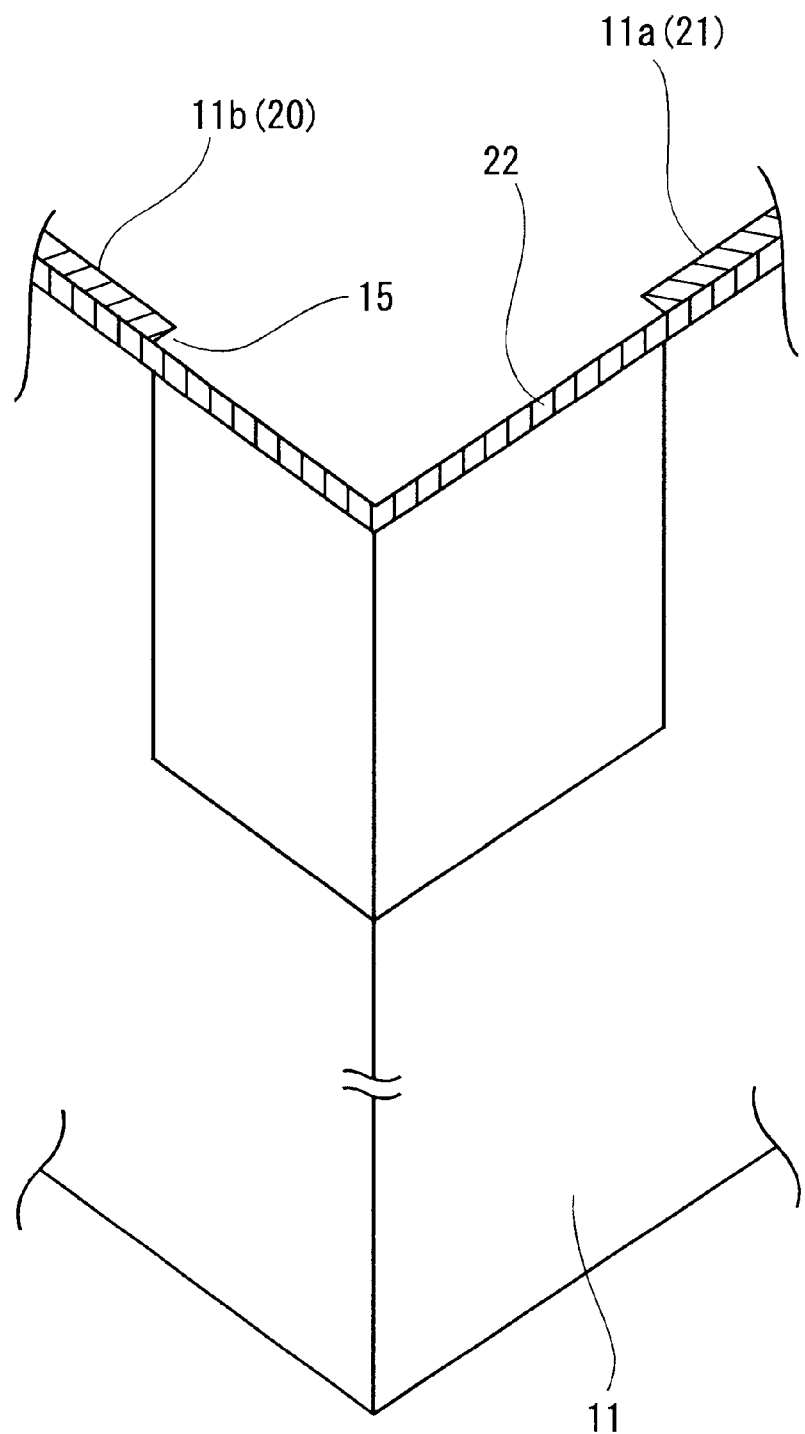
FIG. 3 shows a portion of the packaging box corresponding to a window.
Figure 4A:
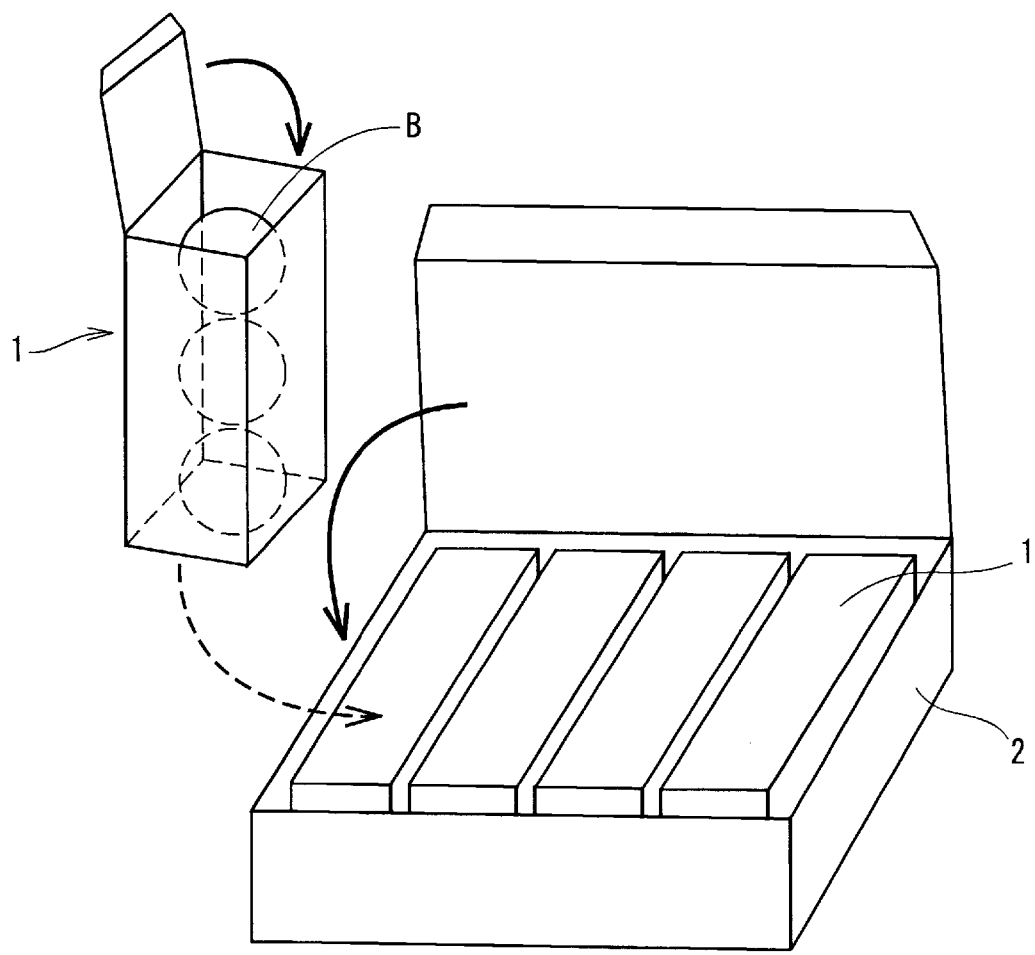
FIGS. 4A and 4B are perspective views showing a conventional packaging box.
Figure 4B:
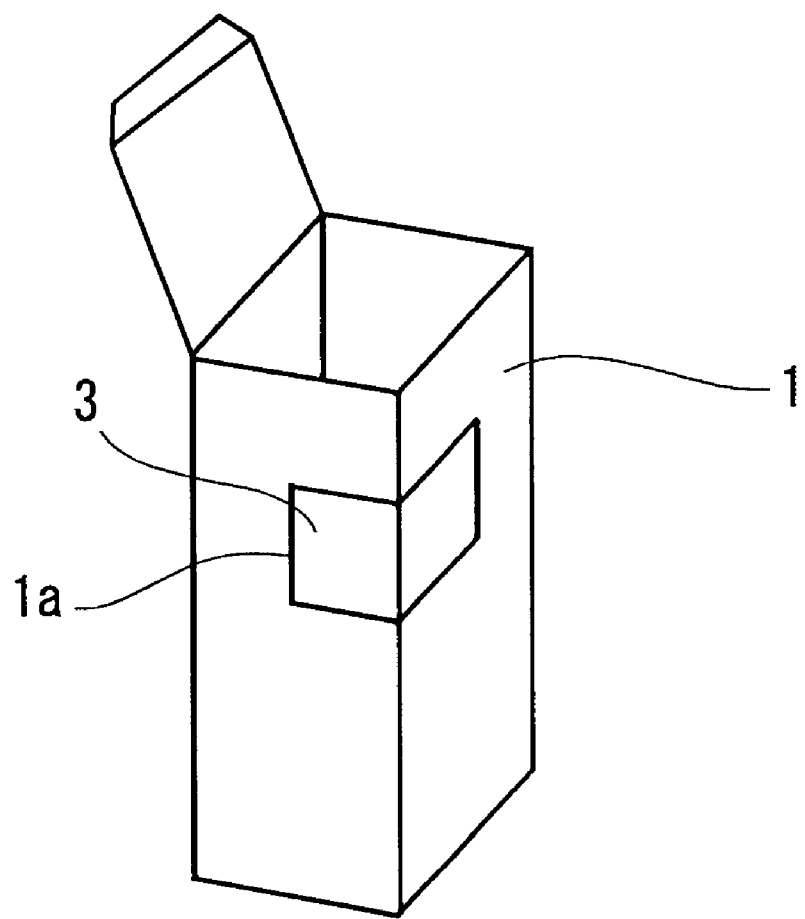

FIG. 1 shows a packaging box 10 to be used as an inner box accommodating golf balls. The packaging box 10 has a rectangular solid-shaped peripheral wall 11 so sized as to accommodate three golf balls B in series, a bottom wall 12, and a lid 13. To make the packaging box 10, a packaging sheet 20 shown in FIGS. 2A and 2B is punched into a required configuration, both ends of a portion of the packaging sheet corresponding to the peripheral wall 11 are bonded to each other with an adhesive agent, and then the packaging sheet 20 is folded. A rectangular window 15 is formed straddlingly on two adjacent planes 11a and 11b of the peripheral wall 11. A raised portion 16 consisting of characters of "New" is formed on the peripheral wall 11. Needless to say, the size of the packaging box 10 to be used as the inner box is not limited to the above-described one, but may be so varied as to accommodate 1, 2, or 4 golf balls. The inner box is accommodated in an outer box.

The packaging sheet 20 composing the packaging box 10 consists of a thick paper 21 and a polylactic acid-containing polymer film 22 laminated on the thick paper 21. The polylactic acid-containing polymer film 22 consists of a copolymer of polylactic acid or lactic acid and other hydroxy-carboxylic acid or a mixture thereof. A macromolecular material may be added to the copolymer or the mixture if the amount of the macromolecular material is not in a range in which the function of the packaging sheet 20 is obstructed. A plasticizer, a lubricant, an inorganic filler, or an ultraviolet ray absorbing agent may be added to the copolymer or the mixture to adjust the moldability and property thereof.

As the lactic acid, L-lactic acid and D-lactic acid can be used. It is possible to use glycol acid, 3-hydroxybutyric acid, 4-hydroxybutyric acid, 4-hydroxyvaleric acid, 6-hydroxycaprolic acid as the other hydroxy-carboxylic acid. The known condensation polymerization and ring opening polymerization are used to polymerize the lactic acid and the hydroxy-carboxylic acid. Preferably, the average molecular weight of the polymer lies in the range of 10,000 to 1,000,000. If the average molecular weight of the polymer is less than 10,000, it is impossible to allow the property of the polymer to be usable, whereas if the average molecular weight of the polymer is more than 1,000,000, the melting viscosity is so high that the processability thereof is poor.

The polylactic acid-containing polymer film to be used as a laminate material in the present invention is obtained as follows: The polylactic acid-containing polymer film is shaped into a flat or cylindrical undrawn sheet or a sheet-shaped melt by a known fusing molding method such as extrusion method, calender method, press method or the like and then stretching the undrawn sheet or the melt monoaxially or biaxially by rolling method, tenter method, tube method or inflation method. In consideration of the property of a processed article, a film formed by stretching biaxially is more favorable. The film obtained by stretching biaxially has a high degree of crystallization and thus has preferable physical properties. Thus, it is effective to adopt a method of accelerating orientation crystallization of the film by increasing the draw ratio thereof and heat-treating it in an atmosphere having a temperature higher than the crystallization temperature. In the tenter method, normally, the draw ratio in the biaxial stretching method is 1.5–5 times, and the draw temperature is 50–100° C.

The polylactic acid-containing polymer film 22 is bonded to the paper 21 by dry laminating method, wet laminating method, or hot-melt laminating method to obtain the packaging sheet 20 of the packaging box 10 for a golf ball. The paper 21 to which the polylactic acid-containing polymer film 22 is bonded is not limited to a specific one, but it is possible to use Kraft paper, imitation Japanese vellum, paper board, art paper or coated paper as the paper 21.

EXAMPLE

Packaging boxes for a golf ball of examples 1–3 and comparison examples 1–4 were prepared from materials shown in table 1. Each packaging box was formed as an inner box. A window is formed on a part of the peripheral wall of the inner box. The window was covered with the film consisting of the laminate film shown in table 1. A raised portion was also formed on the peripheral wall of the inner box. Coated paper having a weight of 10 $g/m^2$ was used in the examples and the comparison examples.

TABLE 1

|  | E1 | E2 | E3 | CE1 | CE2 | CE3 | CE4 |
|---|---|---|---|---|---|---|---|
| Laminate material | Biaxially drawn Polylactic acid film*1 | ← | ← | Low-density polyethylene*2 | ← | Biaxially drawn polypropylene *3 | ← |
| Film thickness | 25 | 25 | 25 | 25 | 25 | 25 | 25 |
| Accommodated number of balls | 3 | 3 | 4 | 3 | 3 | 3 | 3 |
| Position of window | Corner | Plane | Corner | Corner | Plane | Corner | Plane |
| Biodegradability | ○ | ○ | ○ | x | x | x | x |
| Mar-proof property | ○ | ○ | ○ | x | Δ | x | Δ |

The packaging sheet 20 obtained in the above-described method is cut to a predetermined configuration and folding lines are formed thereon. Then, required edges are bonded to each other with an adhesive agent. Then, the packaging sheet 20 is folded along the folding lines. In this manner, the packaging box for a golf ball shown in FIG. 1 is prepared.

The rectangular window 15 is formed straddlingly on the two adjacent planes 11a and 11b of the peripheral wall 11. After a hole is formed on the paper 21, the polylactic acid-containing polymer film 22 is laminated on the paper, thereby the window 15 is covered with the laminated film. That is, it is unnecessary to perform a work of installing a separate window-covering film on the paper 21.

When the packaging sheet 20 is folded to form a packaging box, the window-covering portion of the polylactic acid-containing polymer film 22 is bent perpendicularly. Consequently, the packaging sheet 20 is cornered. In this state, a sharp edge 22a can be generated at bent positions of the packaging sheet 20 because the polylactic acid-containing polymer film 22 has a high strength and rigidity.

Needless to say, the window 15 may be formed on one plane of the peripheral wall 11 of the packaging box 10.

The raised portion 16 consisting of the characters is formed on the plane 11a at a position located below the window 15. The packaging sheet 20 is pressed with a concave plate and a convex plate disposed above and below the packaging sheet 20 to project the word of "New" from the plane 11a.

The edge of the convex portion of the raised portion 16 is formed sharply, thus allowing the packaging box to have a high quality. In addition to characters, it is possible to projectingly form the shape of a golf ball from the plane 11a such that portions corresponding to dimples are concave.

In the above, E denotes example, and CE denotes comparison example.

The materials shown in table 1 are as follows:
Polylactic acid-containing polymer film formed by biaxial drawing method: produced by Mitsubishi Plastics Inc. in the commercial name of "Ecoloju SFP-25"
Low-density polyethylene film: produced by Tamapoly Co., Ltd. in the commercial name of "Polyethylene film V-1"
Polypropylene film formed by biaxial drawing method: produced by Tohcello Co., Ltd. in the commercial name of "Tohcello OPU-2"

The "Ecoloju SFP-25" which is the polylactic acid-containing polymer film formed by biaxial drawing method was used as the laminate film in the examples 1–3. The "Ecoloju SFP-25" had the following physical properties when it was measured in accordance with JIS K 7127: yield strength: 110 Mpa, breaking strength: 150–180 Mpa, breaking extension: 100–80%, and modulus in tension: 3.7–4.1 Gpa.

The biodegradability and mar-proof property of the packaging sheet composing the packaging box of each of the examples 1–3 and the comparison examples 1–4 were tested.

Biodegradable Test

The weight-change percentage of the packaging sheet composing the packaging box of each of the examples 1–3 and the comparison examples 1–4 was examined by putting it in a home composter. A mixture containing leaf mold and a nutritive substance (called dog food) at the ratio of 2:1 was put in the composter. For a month, 500 milliliters of water was put in the composter a day and the temperature was kept at 60° C. during the period of time. When the packaging sheet is decomposed, its weight decreases and its weight-maintaining percentage for the original weight decreases.

The packaging sheets that had the weight-maintaining percentage at less than 20% were marked by ○, thus, the packaging sheets which decreased in its weight at a percentage higher than 80% for the original weight were determined as biodegradable. The packaging sheet which had the weight-maintaining percentage at more than 20% were marked by ×.

As shown in table 1, the packaging sheet of each of the examples 1–3 was all evaluated by ○, whereas the packaging sheet of each of the comparison examples 1–4 having the conventional film laminated on paper was all evaluated by ×.

Mar-Proof Test

Golf balls were put in the inner box of each of the examples 1–3 and the comparison examples 1–4 to conduct a mar-proof property test by transporting the inner boxes 1000 km. The window of each inner box was visually checked after they were transported 1000 km to evaluate the windows as follows: The windows which were not damaged or bent were marked by ○. Those which were not damaged but bent were marked by Δ. Those which were damaged and bent were marked by ×.

As shown in table 1, the window of each of the examples 1–3 was all evaluated by ○, whereas the window of the comparison examples 1–4 were evaluated by Δ and ×.

A test of checking the outlook of the raised portion (raised character) was conducted. The result was that the raised portions of the examples 1–3 had a finish more favorable than those of the comparison examples 1–4. The raised portion of each of the examples 1–3 had an edge distinctly formed.

From the tests, it was confirmed that the packaging sheet having the polylactic acid-containing polymer film formed by the biaxial drawing method was each biodegradable and superior in mar-proof property and the outlook of the raised portion. It was also confirmed that the packaging sheets of the comparison examples 1–4 having the conventional film laminated on the paper respectively and having the same thickness as that of the packaging sheets of the examples 1–3 were inferior in their mar-proof properties. This is because the window-covering portion of the packaging sheets of the comparison examples 1–4 were bent perpendicularly, the packaging sheets were damaged by collision of golf balls therewith. It was also confirmed that the packaging sheets of the comparison examples 1–4 were not biodegradable.

As apparent from the foregoing description, the packaging box for a golf ball of the present invention is composed of the packaging sheet having the biodegradable polylactic acid-containing polymer film laminated on the paper. Thus when the packaging box is disposed into the ground, it can be changed into a harmless decomposed substance. When the packaging box is burnt, it does not pollute the atmosphere. Thus, the packaging box is preferable in consideration of environmental protection.

The polylactic acid-containing polymer film composing the laminate material is high in strength and rigidity. the packaging box of the present invention is composed of the packaging sheet having the biodegradable polylactic acid-containing polymer film laminated on the paper. Therefore, the packaging box is higher than the conventional packaging box in strength and mar-proof performance. Further, the polylactic acid-containing polymer film has a high degree of transparency and glossiness. Thus, the packaging box appears fine.

Because the window of the packaging box is covered with the polylactic acid-containing polymer film having a high degree of strength and rigidity, the packaging box is not marred easily by vibrations during transport thereof. Thus, the window can be large-sized. Further, when the window-forming portion of the packaging sheet is bent perpendicularly, the packaging sheet can form a sharp edge. Further, raising processing of forming a fine convex portion on the surface of the packaging sheet can be preferably accomplished. Thus, the packaging box is allowed to look fine.

What is claimed is:

1. A packaging box, for at least one golf ball, formed by folding a packaging sheet comprising a decomposable laminate material consisting of a polylactic acid-containing polymer film and a paper laminated with said polylactic acid-containing polymer film, wherein a portion corresponding to a window is cut out from said paper, and said window is covered with said polylactic acid-containing polymer film laminated on said paper, said window being formed straddlingly on two or three planes such that said polylactic acid-containing polymer film covering said window is bent perpendicularly at a boundary between said planes adjacent to each other, wherein said polylactic acid-containing polymer film is obtained by biaxial stretching with a draw ratio that is 1.5 to 5 times and a draw temperature of 50° to 100°, and wherein said polylactic acid-containing polymer film when measured in accordance with JIS K-7127 has a yield strength of 110 Mpa, breaking strength of 150–180 Mpa, breaking extension of 100–80%, and modulus in tension of 3.7–4.1 Gpa.

2. The packaging box according to claim 1, wherein a raised portion is formed on said packaging sheet.

* * * * *